Lockhart & Gracie.
Still for Petroleum &c.
No. 3003 Reissued Jun. 23, 1868
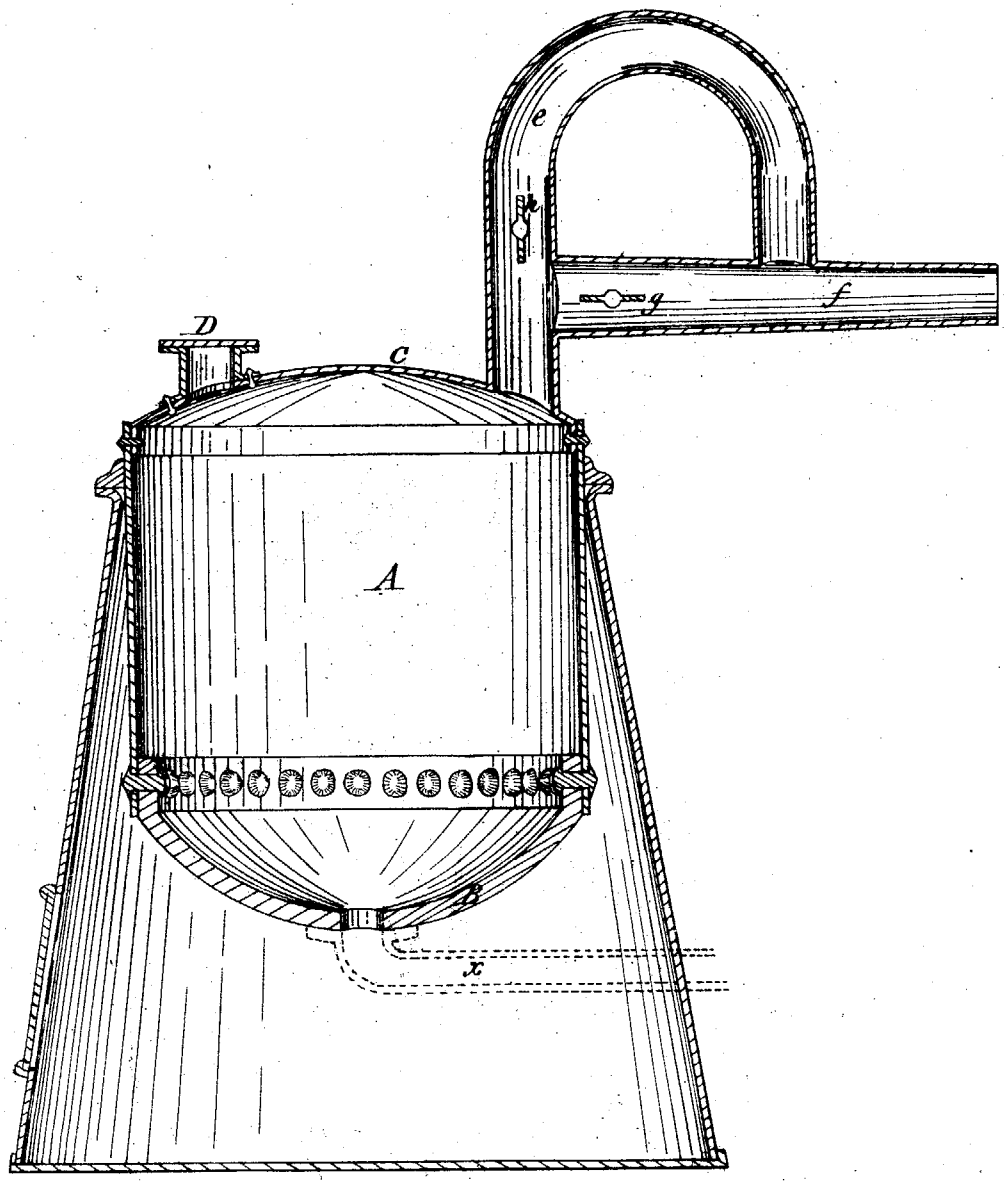
Witnesses
James I. Johnston
A. C. Johnston
Inventor
Charles Lockhart
John Gracie

UNITED STATES PATENT OFFICE.

CHARLES LOCKHART AND JOHN GRACIE, OF PITTSBURG, PENNSYLVANIA.

IMPROVEMENT IN STILLS FOR PETROLEUM, &c.

Specification forming part of Letters Patent No. 40,632, dated November 17, 1863; Reissue No. 3,003, dated June 23, 1868.

DIVISION B.

*To all whom it may concern:*

Be it known that we, CHARLES LOCKHART and JOHN GRACIE, of Pittsburg, in the county of Allegheny and State of Pennsylvania, have invented a new and useful Improvement in Stills for Petroleum; and we do hereby declare that the following is a full and exact description thereof, reference being had to the accompanying drawings, and to the letters of reference marked thereon.

The nature of our invention consists in so constructing that part of the still (ordinarily called the "goose-neck") to which the condenser is attached, that the vapor, as it is evolved from the oil, may be carried off from the still at different heights, for the purpose hereinafter set forth.

To enable others skilled in the art of constructing stills for the distillation of petroleum to make and use our invention, we will proceed to describe its construction and operation.

In the accompanying drawings, which form part of our specification, A represents an ordinary still for the distillation of petroleum, provided with our improvement for carrying off the vapor from the still at different heights.

The device we use for this purpose consists in the use of pipes *e* and *f*, provided with valves *h* and *g*. The form and the relation that the pipes *e* and *f* bear to each other, and the arrangement of the valves *h* and *g*, are clearly shown in the accompanying drawings. The lower end of the pipe *e* is secured by any known means to the top C of the still, and the condenser is attached to the outer end of the pipe *f*. The top C of the still is provided with a man-hole opening, (marked D,) for the purpose of gaining access to the interior of the still for cleaning, repairing, and other purpose which may be necessary. To the center of the bottom B of the still A is attached a pipe, as indicated by the dotted lines X. This pipe is used for the purpose of carrying off heavy oil, tarry matter, or the refuse of distillation.

The furnace for the still may be constructed in any of the known forms and of the ordinary material.

In the process of distilling petroleum, the first product of the still is the light volatile oil known as "benzole" or "naphtha." The next product of the still is burning-oil, known in commerce as "carbon-oil," "coal-oil," &c. This burning-oil should have a specific gravity of about forty-five degrees of the hydrometer, and for a "fire-test" should be susceptible of being heated to about 115° Fahrenheit without igniting or flashing on the application of a lighted match. Oil having these qualities is considered a good article of burning-oil, and will always bring the highest market price. Now, one of the greatest difficulties in producing such oil is the fact that, during the process of distilling petroleum, paraffine is carried over with the product of distillation, and this paraffine gives the oil a yellow cast, and causes the oil when heated to throw off a very inflammable and explosive gas; hence such oil is considered dangerous, and is of less value in the market as an article of trade.

Now, the object of our invention is to overcome this difficulty in the process of distilling petroleum, and enable the refiner, by a very simple device, to produce a good, safe, and desirable burning-oil. This we accomplish by the use of pipes *e* and *f* and their valves *g* and *h*, arranged with relation to the still in the manner substantially as represented in the accompanying drawings, or by the equivalent of said pipes and valves.

When the still A is filled to the desired degree with oil, the valve *g* of the pipe *f* is closed, and the valve *h* of the pipes *e* is opened, and the vapor from the still passes up through the pipe *e* and down into pipe *f*, and from it to the condenser. The distilling is carried on with the vapor passing through pipe *e* until it is observed by the operator that the flow of oil from the condenser is diminishing; then the valve *h* of pipe *e* is closed, and the valve *g* is opened, which will allow the vapor to pass direct through the pipe *f* to the condenser. By thus changing the course of the vapor through the pipes, the flow of oil from the condenser will be kept uniform in quantity, other things in the distilling process being equal. When the operator notices a change in the color of the oil flowing from the condenser—that is to say, the oil changing from a white to a yellow color—he must then close the valve *g* and open the valve *h*, which will immediately change the flow and color of the oil flowing from the condenser.

The advantages which result from the use of our improvement are as follows: first, a uniform and steady flow of oil from the condenser in the distilling process; second, a white oil free from paraffine; third, a great saving in the use of chemicals in the refining and deodorizing of the oil; fourth, speed and safety in distilling petroleum; fifth, a better article of burning-oil, and free from danger in burning.

Having thus described the nature, construction, and operation of our improvement, what we claim as of our invention is—

A still provided with a pipe or pipes which is or are so arranged with relation to the still and its contents that the vapor evolved from the contents of the still can be conveyed off at different heights, substantially as herein shown, and for the purpose set forth.

CHARLES LOCKHART.
JOHN GRACIE.

Witnesses:

A. C. JOHNSTON,
JAMES J. JOHNSTON.